US009166405B2

(12) United States Patent
Brandt et al.

(10) Patent No.: US 9,166,405 B2
(45) Date of Patent: Oct. 20, 2015

(54) ENERGY HARVESTING LOAD CONTROL SWITCH

(71) Applicants: Nathan Allen Brandt, Maple Grove, MN (US); Richard William Lucas, Cambridge, MN (US); Justin Bruce Johnson, Coon Rapids, MN (US); Brent Thomas Jonasson, Buffalo, MN (US)

(72) Inventors: Nathan Allen Brandt, Maple Grove, MN (US); Richard William Lucas, Cambridge, MN (US); Justin Bruce Johnson, Coon Rapids, MN (US); Brent Thomas Jonasson, Buffalo, MN (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 484 days.

(21) Appl. No.: 13/625,397

(22) Filed: Sep. 24, 2012

(65) Prior Publication Data

US 2014/0088776 A1   Mar. 27, 2014

(51) Int. Cl.
*G05D 3/12* (2006.01)
*H02J 3/00* (2006.01)
*H02J 7/00* (2006.01)
*H01H 47/22* (2006.01)
*H02J 3/32* (2006.01)
*H02J 3/14* (2006.01)
*H02J 3/38* (2006.01)
*H02J 7/34* (2006.01)

(52) U.S. Cl.
CPC ............... *H02J 3/005* (2013.01); *H01H 47/22* (2013.01); *H02J 3/32* (2013.01); *H02J 7/008* (2013.01); *H02J 3/14* (2013.01); *H02J 3/382* (2013.01); *H02J 3/387* (2013.01); *H02J 7/345* (2013.01); *Y02B 20/48* (2013.01); *Y04S 20/14* (2013.01)

(58) Field of Classification Search
USPC ................................. 700/286, 291, 295, 297
See application file for complete search history.

(56) References Cited

U.S. PATENT DOCUMENTS

| 4,288,990 | A | | 9/1981 | Schulz | |
|---|---|---|---|---|---|
| 5,055,962 | A | * | 10/1991 | Peterson et al. | 361/187 |
| 5,903,065 | A | * | 5/1999 | Dragos | 307/64 |
| 5,957,374 | A | * | 9/1999 | Bias et al. | 236/78 R |
| 6,310,497 | B1 | * | 10/2001 | Strauss | 327/143 |
| 7,809,968 | B2 | * | 10/2010 | Karstens | 713/323 |
| 8,594,956 | B2 | * | 11/2013 | Banting et al. | 702/64 |
| 8,892,266 | B2 | * | 11/2014 | Rossi et al. | 700/291 |

(Continued)

OTHER PUBLICATIONS

The International Search Report and Written Opinion from Corresponding PCT Application No. PCT/US2013/061279, mailed Jan. 10, 2014, 7 pages.

*Primary Examiner* — Darrin Dunn
(74) *Attorney, Agent, or Firm* — King & Spalding LLP

(57) ABSTRACT

A method, device, and system for controlling power delivered to a power-consuming device. The device can harvest power from a conductor carrying a high voltage using a power harvesting device. The device can include a power storage device to power a hardware processor and a communication component when there is no voltage flowing through the conductor. The device can determine when a control event is to occur. At such time, the device terminates control power delivered to the power-consuming device and continues to withhold the control power until the control event expires. When the control event has ended, the device allows control power to flow to the power-consuming device. The device uses a timer and the communication component to send and receives signals associated with a control event to a user. The device can also operate in a limited mode to conserve power when the device is not in use.

19 Claims, 7 Drawing Sheets

(56) References Cited

U.S. PATENT DOCUMENTS

| | | |
|---|---|---|
| 2003/0001434 A1 | 1/2003 | Saito et al. |
| 2009/0058663 A1* | 3/2009 | Joshi et al. .................. 340/584 |
| 2010/0033138 A1* | 2/2010 | Alger et al. .................. 320/153 |
| 2011/0298300 A1 | 12/2011 | Gray et al. |
| 2012/0080944 A1* | 4/2012 | Recker et al. ................. 307/25 |
| 2012/0126021 A1 | 5/2012 | Warren et al. |
| 2012/0191253 A1 | 7/2012 | Rockenfeller et al. |
| 2013/0004177 A1* | 1/2013 | Deligiannis .................. 398/106 |
| 2013/0132010 A1* | 5/2013 | Winger et al. .................. 702/63 |
| 2014/0077776 A1* | 3/2014 | Nguyen et al. ................. 323/271 |
| 2014/0088776 A1* | 3/2014 | Brandt et al. .................. 700/295 |

* cited by examiner

ENERGY HARVESTING LOAD CONTROL SWITCH

TECHNICAL FIELD

The present disclosure relates generally to load control switches (LCSs) and more particularly to systems, methods, and devices for energy harvesting LCSs that harvest energy from voltage fed to one or more power-consuming devices.

BACKGROUND

LCSs (sometimes referred to as load control receivers (LCRs)) are used as part of a demand-side management scheme to control the operation of certain power-consuming devices. Examples of such power-consuming devices include, but are not limited to, an air conditioning unit, a water heater, a heater, and a circulation fan. Controlling such power-consuming devices involves determining when a control event (i.e., preventing power from flowing to such devices) occurs and for how long.

At times, a LCS is installed with an existing power-consuming device. In such a case, the LCS is installed by electrically coupling different components of the existing power-consuming device to various portions of the LCS. For example, a power source from the power-consuming device is electrically coupled to the LCS. Such work often requires a licensed electrician because the power required by the LCS is at least 110 V alternating current (AC), and so applicable regulations often require a licensed electrician when working with wiring at such voltages. Consequently, the installation of LCSs can be expensive and inconvenient.

SUMMARY

In general, in one aspect, the disclosure relates to a method for controlling power delivered to a power-consuming device. The method can include receiving an energy signal harvested from an energy source, and charging a power storage device using the energy signal. The method can also include applying power from the power storage device to a number of components, where the components include a timer, a hardware processor, and a communication component. The method can further include determining, using the communication component, the hardware processor, and the timer, a start time of a control event, and terminating, using a relay at the start time of the control event, the power delivered to the power-consuming device. The method can also include delivering, using the relay at an end time of the control event, the power to the power-consuming device.

In another aspect, the disclosure can generally relate to a load control switch. The load control switch can include an energy harvesting device and a housing. The energy harvesting device can capture a representation of the operating parameter from an energy source. The housing can include a power storage device electrically coupled to the energy harvesting device. The housing can also include a timer electrically coupled to the power storage device, and memory for storing a number of instructions. The housing can further include a hardware processor electrically coupled to the power storage device and the timer, and communicably coupled to the memory, where the hardware processor executes the instructions stored in the memory. The housing can also include a communication component communicably coupled to the hardware processor, where the communication component receives a signal for a control event. The housing can further include a relay electrically coupled to the hardware processor and the power supply, where the relay includes a relay contact, where the relay contact has an open state and a closed state, where the open state is enabled during the control event, and where the closed state is enabled outside of the control event.

In yet another aspect, the disclosure can generally relate to a power-consuming device, a transformer, a thermostat, and a load control switch. The transformer can process a line voltage carried on a conductor from a primary power source. The thermostat can be electrically coupled to the transformer, where the thermostat has an enabled state and a disabled state, where the enabled state allows power from the primary power supply to pass therethrough, and where the disabled state prevents the power from the primary power supply to pass therethrough. The load control switch can be electrically coupled to the thermostat and the power-consuming device. The load control switch can include a power storage device electrically coupled to a device that harvests energy from an energy source, and a timer electrically coupled to the power storage device. The load control switch can also include memory for storing a number of instructions, and a hardware processor electrically coupled to the power storage device and the timer, and communicably coupled to the memory, where the hardware processor executes the instructions stored in the memory. The load control switch can further include a communication component communicably coupled to the hardware processor, where the communication component receives a signal for a control event. The load control switch can also include a relay electrically coupled to the hardware processor, the thermostat, and the power-consuming device, where the relay includes a relay contact, where the relay contact has an open state and a closed state, where the open state is enabled during the control event, and where the closed state is enabled outside of the control event. The relay contact, when in the closed state, can deliver the line voltage processed by the transformer to the power-consuming device.

These and other aspects, objects, features, and embodiments will be apparent from the following description and the appended claims.

BRIEF DESCRIPTION OF THE DRAWINGS

The drawings illustrate only exemplary embodiments and are therefore not to be considered limiting in scope, as the exemplary embodiments may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION

Figure 1:
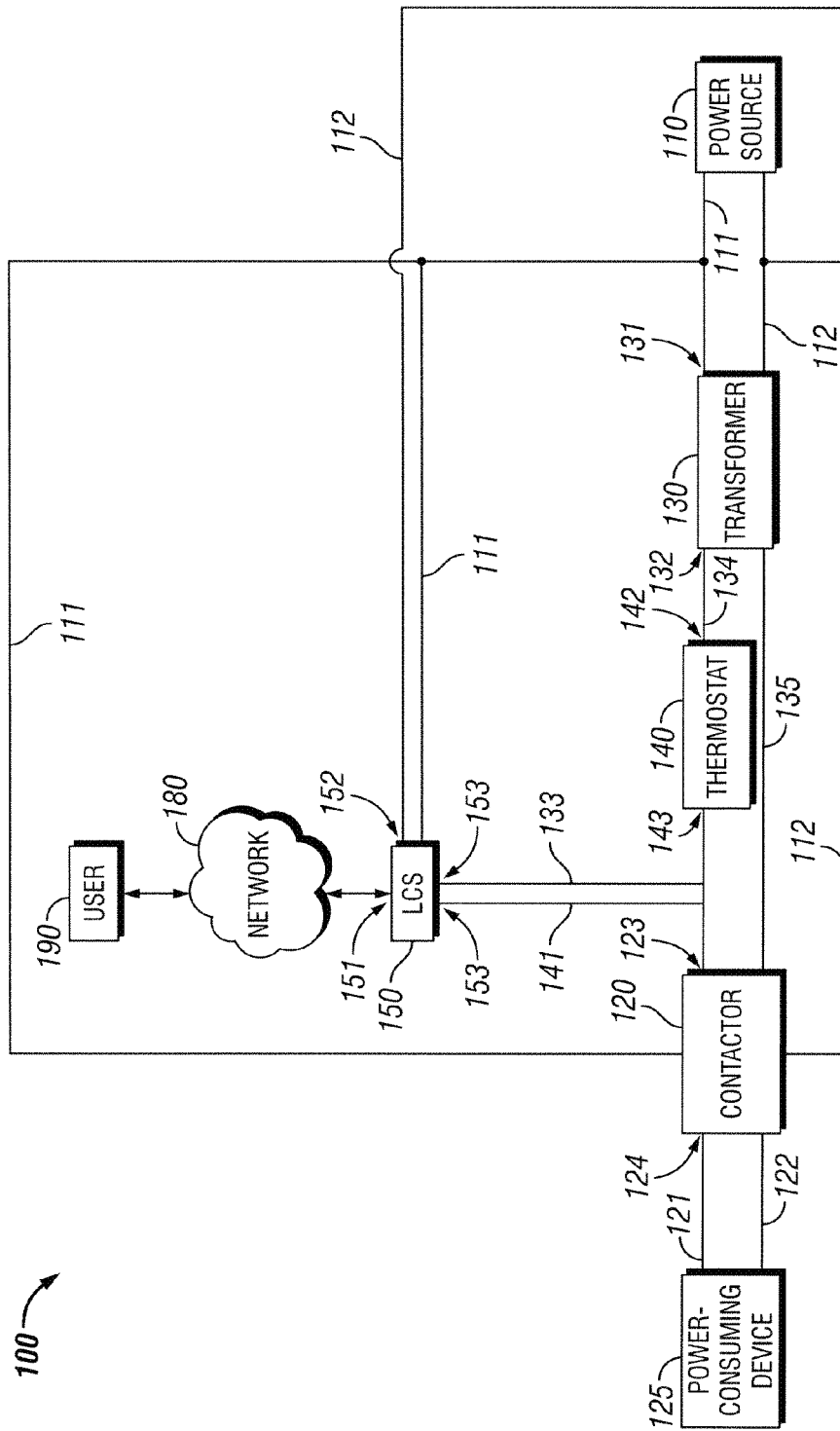
FIG. 1 shows a block diagram of a system that includes a power-consuming device and a LCS configured in a way known in the art.

Exemplary embodiments of an energy harvesting LCS will now be described in detail with reference to the accompanying figures. Like, but not necessarily the same or identical, elements in the various figures are denoted by like reference numerals for consistency. In the following detailed description of the exemplary embodiments, numerous specific details are set forth in order to provide a more thorough understanding of the disclosure herein. However, it will be apparent to one of ordinary skill in the art that the exemplary embodiments herein may be practiced without these specific details. In other instances, well-known features have not been described in detail to avoid unnecessarily complicating the description. Further, certain descriptions (e.g., top, bottom, side, end, interior, inside, inner, outer) are merely intended to help clarify aspects of the invention and are not meant to limit embodiments described herein.

In general, exemplary embodiments provide systems, methods, and devices for energy harvesting LCSs. Specifically, exemplary embodiments provide for LCSs that harvest energy from one or more conductors carrying a power signal (i.e., at least 110 VAC), also called a voltage signal or a high voltage. Energy can be harvested from a power source and/or an energy source, as described below. The energy harvesting can be accomplished using a clamp-on current transformer (CT) or similar harvesting device. Examples of a harvesting device can include, but are not limited to, an inverter, a converter, a transformer, and a current shunt. By providing a LCS that harvests energy in such a way, the installation of an exemplary LCS can be performed without a licensed electrician. As a result, using exemplary embodiments described herein, the LCS can be installed more easily, at a higher level of convenience, and at a lower cost. As used herein, low voltage can also mean low current and/or low power.

An electrical connection made between a component of a power-consuming device (or part of a system thereof) and the exemplary LCS can involve a single conductor mated with a single conductor receiver. Alternatively, an electrical connection can also involve multiple conductors and/or multiple conductor receivers. As another alternative, an electrical connection can involve a male and corresponding female mating connector.

Exemplary LCSs discussed herein can be used with one or more of a number of voltages and/or currents. For example, a LCS can harvest energy from a conductor carrying a voltage signal (e.g., 110 VAC, 240 VAC) while also sending, along a separate electrical path within the LCR, a different lower voltage (e.g., 24 VAC), also called a control voltage or control signal. Some of the power flowing through at least part of the LCS can also flow through the thermostat (or similar control device) used for the power-consuming device.

Any contact (e.g., for a relay, thermostat, contactor) described herein can be normally-open or normally-closed. A contact that is closed is enabled, and a contact that is open is disabled. When a contact is described as normally-open, the contact can, in an alternative embodiment, be configured as normally-closed. Likewise, a contact described as normally-closed can, in an alternative embodiment, be configured as normally-open. In such a case, other components (e.g., a coil) can be configured the same or differently to achieve the same operational result.

In certain exemplary embodiments, a latch relay can be used. A contact for a latch relay maintains its most recent state from when the coil was most recently exercised. The subsequent time the coil is energized, the contact changes state (e.g., from open to closed, from closed to open) from its previous state and maintains that new state until the next time the coil is energized, and so on. When one voltage (e.g., a control voltage) is electrically coupled to the coil of the relay, a different voltage (e.g., a power voltage) can be electrically coupled to the contact of the relay.

In certain exemplary embodiments, the exemplary energy harvesting LCR, the power-consuming device to which the exemplary LCS is coupled, and/or a system that includes the exemplary energy harvesting LCS is subject to meeting certain standards and/or requirements. For example, the National Electric Code (NEC) and the Institute of Electrical and Electronics Engineers (IEEE) set standards as to wiring and electrical connections. As another example, the National Electrical Manufacturer's Association (NEMA) classifies electrical connectors by current ratings (e.g., 15 A, 60 A), voltage ratings (e.g., 125V, 600V), conductor dimensions (e.g., widths, shapes, orientation), grounding requirements, and other factors. Use of exemplary embodiments described herein meet (and/or allow a corresponding device to meet) such standards when required.

FIG. 1 depicts a block diagram of a system 100 that includes a power-consuming device and a LCS currently known in the art. FIG. 1 includes a power source 110, a LCS 150, a user 190, a transformer 130, a thermostat 140, a contactor 120, and a power-consuming device 125. One or more components shown in FIG. 1 can be omitted, repeated, and/or substituted.

The power source 110 is shown being electrically coupled to the LCS 150, the contactor 120, and the primary side 131 of the transformer 130. The power source 110 typically provides electricity that is in AC format and/or direct current (DC) format. The power source 110 can be physically separate from the other components of the system 100 and/or internal within another component of the system 100. In cases where the power source 110 delivers AC power, the power source 110 has a voltage conductor 111 and a neutral conductor 112. In cases where the power source 110 delivers DC power, the power source 110 has a positive conductor 111 and a negative conductor 112. For purposes of this example, an AC system is described, but those skilled in the art will appreciate how an AC system can be substituted for a DC system.

Each voltage conductor and/or neutral conductor described herein can carry voltage, current, or a combination thereof. In addition, each voltage conductor and/or neutral conductor described herein can be wire, cable, or other medium that can carry a voltage and/or current therethrough. The conductor can be made of an electrically conductive material (e.g., copper, aluminum) and can have one or more electrically non-conductive materials (e.g., rubber, nylon, plastic) wrapped around the electrically conductive material. The electrically conductive material of the conductor can be one of a number of sizes (e.g., 10 American wire gauge (AWG), 12 AWG, 16 AWG) that allow the conductor to carry the voltage and/or current required for the system 100. A lead, described below with respect to a current transformer, can also be a conductor.

The amount of voltage delivered by the power source 110 to the primary side 131 of the transformer 130 can be any amount suitable to operate the elements of the LCS 150 as well as the other elements electrically coupled to the secondary side 132 of the transformer 130. In certain exemplary embodiments, the voltage delivered by the power source 110 is transformed, rectified, inverted, and/or otherwise manipulated, at the power source 110 so that the primary side 131 of the transformer 130 receives a proper voltage level to operate properly.

In certain exemplary embodiments, the power source 110 is interruptible. For example, an "on/off" switch (not shown) may be integrated with, or operatively coupled to, the power source 110. Such an "on/off" switch can be used to allow and prevent power from flowing to the LCS 150 and/or other components of the system 100. The "on/off" switch can be operated by a user 190, by a sensing device, by a timer, by the occurrence of some condition (e.g., the passage of time), by some other factor, or any combination thereof. The "on/off" switch may be integrated with, or separate from, the power source 110.

The LCS 150 is electrically coupled to the voltage conductor 111 from the power source 110 and receives power from the power source 110 through the voltage conductor 111 and the neutral conductor 112 at the power-receiving portion 152 of the LCS 150. For example, the LCS 150 can receive 120 VAC through the voltage conductor 111 at the power-receiving portion 152 and complete the circuit back to the power source 110 using the neutral conductor 112. Because the LCS 150 is electrically coupled directly to the power source 110, the LCS 150 can always be on. The LCS 150 also includes a relay contact portion 153. The relay contact of the relay contact portion 153 has one side electrically coupled to the output portion 143 of the thermostat 140 using conductor 133, while the other side of the relay contact portion 153 of the LCS 150 is electrically coupled to the input portion 123 of the contactor 120 using conductor 141.

Details of the components of the LCS 150 are described below with respect to FIGS. 3A, 3B, and 4. In general, the LCS communicates, using a communication portion 151, with a third party to receive instructions as to when the LCS 150 terminates and/or allows the delivery of power to the transformer 130 and, ultimately, the power-consuming device 125. Such an event is called a control event. The LCS 150 uses the power received from the power source 110 to operate one or more control devices (e.g., relays), communication devices, timers, and/or other suitable components within the LCS 150. When a control event does not exist, the LCS 150 allows the power from the contactor 120 to pass through the relay contact of the relay contact portion 153 to the voltage conductor 121 feeding the power-consuming device 125.

A user 190 can be any person, entity, and/or device that interacts with the LCS 150. One or more users 190 can communicate with the LCS 150. Examples of a user 190 can include, but are not limited to, a master controller, an energy management system, a homeowner, a consumer, a landlord, an electric distribution company, an electric transmission company, a public utility, a control room operator, a load management system, an engineer, an electrician, an instrumentation and controls technician, a mechanic, an operator, a consultant, a contractor, and a manufacturer's representative.

The user 190 communicates with the LCS 150 using a network 180. The network can be any type of wired and/or wireless communication system that allows the user 190 and the LCS 150 to send and receive signals between each other. The system and/or protocols used by the user 190 and compatible for communication with the LCS 150. Communication by the LCS 150 is performed by the communication component of the LCS 150, described below with respect to FIGS. 3A and 3B.

The transformer 130 of FIG. 1 is a charge transfer device that receives a voltage and/or current on the primary side 131 and generates a voltage and/or current on the secondary side 132. The transformer 130 can include a number of windings (e.g., inductors) made of an electrically conductive material (e.g., copper, aluminum), one or more solid state components (e.g., integrated gate-commutated thyristors, silicon controlled thyristors), or any combination thereof. The transformer 130 can be configured for AC-to-DC transformation (also called inversion), DC-to-AC transformation (also called conversion), AC-to-AC transformation, and DC-to-DC transformation.

The transformer 130 can be a step-up (higher voltage and/or current on the secondary side 132 when compared to the primary side 131) transformer or a step-down (lower voltage and/or current on the secondary side 132 when compared to the primary side 131) transformer. The primary side 131 and the secondary side 132 can have one or more ratios relative to each other. For example, the ratio between the primary side 131 and the secondary side 132 can be 5:1, which would convert 120 VAC received on the primary side 131 to generate 24 VAC on the secondary side 132. As another example, the ratio between the primary side 131 and the secondary side 132 can be 10:1, which would convert 240 VAC received on the primary side 131 to generate 24 VAC on the secondary side 132. In either example, the primary side 131 of the transformer 130 interacts with a power voltage, while the secondary side 132 of the transformer 130 generates a signal voltage based on the power voltage. The transformer 130 can have one or more settings that allow the ratio between the primary side 131 and the secondary side 132 to vary, either according to input received from a user 190 and/or from software instructions.

The secondary side 132 of the transformer 130, like the primary side 131, has a conductor 134 and a conductor 135. The conductor 134 of the secondary side 132 is electrically coupled to the input portion 142 of the thermostat 140, while the conductor 135 of the secondary side 132 is electrically coupled to the input portion 123 of the contactor 120.

The optional thermostat 140 is a form of a control device that controls the voltage and/or current flowing through the conductor 134 of the secondary side 132 of the transformer 130 to pass therethrough. The thermostat 140 can serve one or more of a number of functions. For example, the thermostat 140 can compare an ambient temperature with a threshold temperature. In such a case, the thermostat 140 can also control a heating, ventilation, and air conditioning unit (HVAC) unit when the power-consuming device 125 is the HVAC unit. Generally speaking, the thermostat 140 has an enabled state and a disabled state. The enabled state allows the voltage and/or current flowing through the conductor 134 of the secondary side 132 of the transformer 130 to pass therethrough to the output portion 143 of the thermostat 140, which is electrically coupled to the input of the contactor 120 by conductor 141. By contrast, the disabled state of the thermostat 140 prevents the voltage and/or current flowing through the output portion 143 of the thermostat 140 using the conductor 134 to the secondary side 132 of the transformer 130.

In certain exemplary embodiments, the thermostat 140 toggles between the enabled state and the disabled state based on whether a parameter (e.g., ambient temperature, air pressure, air flow) exceeds (or in some cases falls below) a threshold value. For example, in terms of a system 100 where the power-consuming device 125 is an air conditioning (A/C) unit, the thermostat 140 compares the ambient temperature at some location with a maximum temperature threshold. If the ambient temperature falls below the maximum temperature threshold, then the thermostat 140 is in the disabled state, which prevents the A/C unit from turning on. If the ambient temperature exceeds the maximum temperature threshold, then the thermostat 140 is in the enabled state, which allows the A/C unit to turn on.

The thermostat 140 can operate using one or more discrete components (e.g., resistors, capacitors, inductors), a hardware processor, some other component, or any combination thereof. The threshold value can be set by a user 190 (e.g., manually with a switch or dial, using a user 190 interface on the thermostat 140, using an application interface from a remote computing device that is communicably coupled to the thermostat 140), by default, automatically using software and based on one or more parameters (e.g., time of year, time of day, geographic location), by some other method, or any combination thereof.

The optional contactor 120 includes a power-receiving portion 123 (in this case receiving a control signal using conductor 141 and conductor 135). As such, the contactor 120 is electrically coupled to the LCS 150 and the transformer 130, and signal voltages flow through the associated conductors. The contactor 120 also includes a relay contact portion 124 (in this case receiving a power voltage signal from conductor 111 and 112. The relay contact portion 124 of the contactor 120 is electrically coupled to the power-consuming device 125 using the conductor 121 and the conductor 122, through which the power voltage flows. The contactor 120 is used to protect the power-consuming device 125 as well as the upstream components (e.g., the thermostat 140, the LCR 150) from voltage and/or current spikes that can result when the power-consuming device 125 is initially powered up and when power to the power-consuming device 125 is terminated. In certain exemplary embodiments, the contactor 120 is part of the power-consuming device 125.

The voltage-receiving portion 123 of the contactor 120 can include an electromagnet, coil, or some similar component that receives the control voltage and/or current from the conductor 141 and provides a driving force to close the contacts of the relay contact portion 124 of the contactor 120. Normally, the contacts of the relay contact portion 124 are normally open (e.g., disabled). In such a case, the contacts are closed when sufficient power (voltage, current) is received by the voltage-receiving portion 123. When signal power (e.g., current, voltage) passes through the electromagnet, a magnetic field is produced. The magnetic field attracts the moving core of the contactor 120. The electromagnet (coil) draws more current initially, until its inductance increases when the metal core enters the coil.

The moving contact is propelled by the moving core, and the force developed by the electromagnet holds the moving and fixed contacts together. When the contactor coil is de-energized, gravity or a spring returns the electromagnet core to its initial position and opens the contacts. When initial power is received from the conductor 141, an electric arc forms across the contacts of the relay contact portion 124 as the contacts close. When the power from the conductor 141 is terminated, another electric arc can form across the contacts as the contacts are physically separated and return to the normally open state. In steady-state operations when the contacts of the relay contact portion 124 are closed and power flows through the contacts, there is no electric arcing that occurs.

If the power-consuming device 125 does not include any components (e.g., motors, heaters, capacitor banks) that draw high initial amounts of voltage and/or current when starting and/or create voltage and/or current spikes when power is terminated. In such a case, the contactor 120 can be omitted, and the power signal can be fed directly to the power-consuming device 125 from the power source 110 using conductor 111 and conductor 112, eliminating conductor 121 and conductor 122. Further, the control signal can be fed to the power-consuming device 125 from the LCS 150 using conductor 141 and from the transformer 130 using conductor 135. In such a case, the power-consuming device 125 includes some internal control scheme that only permits the power-consuming device 125 to operate when the power-consuming device 125 receives the control signal, even though the power-consuming device 125 otherwise receives the power signal from the power source 110.

The electromagnet (coil) of the voltage-receiving portion 123 and the contacts of the relay contact portion 124 are rated (e.g., have the proper size, are made of the proper material) to withstand the steady-state voltage and/or current delivered by the various conductors (e.g., conductor 141, conductor 111), as well as the voltage and/or current spikes that result from initially receiving and terminating the voltage and/or current from the various conductors. Ratings for the contactor 120 can be governed by one or more of a number of entities, including but not limited to NEMA and the International Electrotechnical Commission (IEC).

The power-consuming device 125 can be any electric-powered device that consumes a sufficient amount of power to warrant being subject to a demand response program. Examples of a power-consuming device 125 can include, but are not limited to, an A/C unit, a water heater, a heating unit, a motor, and a large fan. In certain exemplary embodiments, the power-consuming device 125 operates on a power signal rather than a control signal. In cases where the power-consuming device 125 receives both a power signal and a control signal, the control signal is used to enable the power-consuming device 125, where the operating components of the power-consuming device 125 use the power signal to operate once the power-consuming device 125 is enabled.

When the LCS 150 combined with the contactor 120 (or, if there is no contactor 120, the thermostat 140) allows power generated by the power source 110 to pass on to the power-consuming device 125, the power-consuming device 125 operates. When the LCS 150 in combination with the contactor 120 or the thermostat 140 prevents power generated by the power source 110 to pass on to the power-consuming device 125, the power-consuming device 125 does not operate. By adding the LCS 150 into the system 100, a type of demand-side management program can be implemented by having the LCS 150 prevent power from flowing to the power-consuming device 125 during a control event, when the power-consuming device 125 would otherwise receive the power and operate.

Figure 2A:
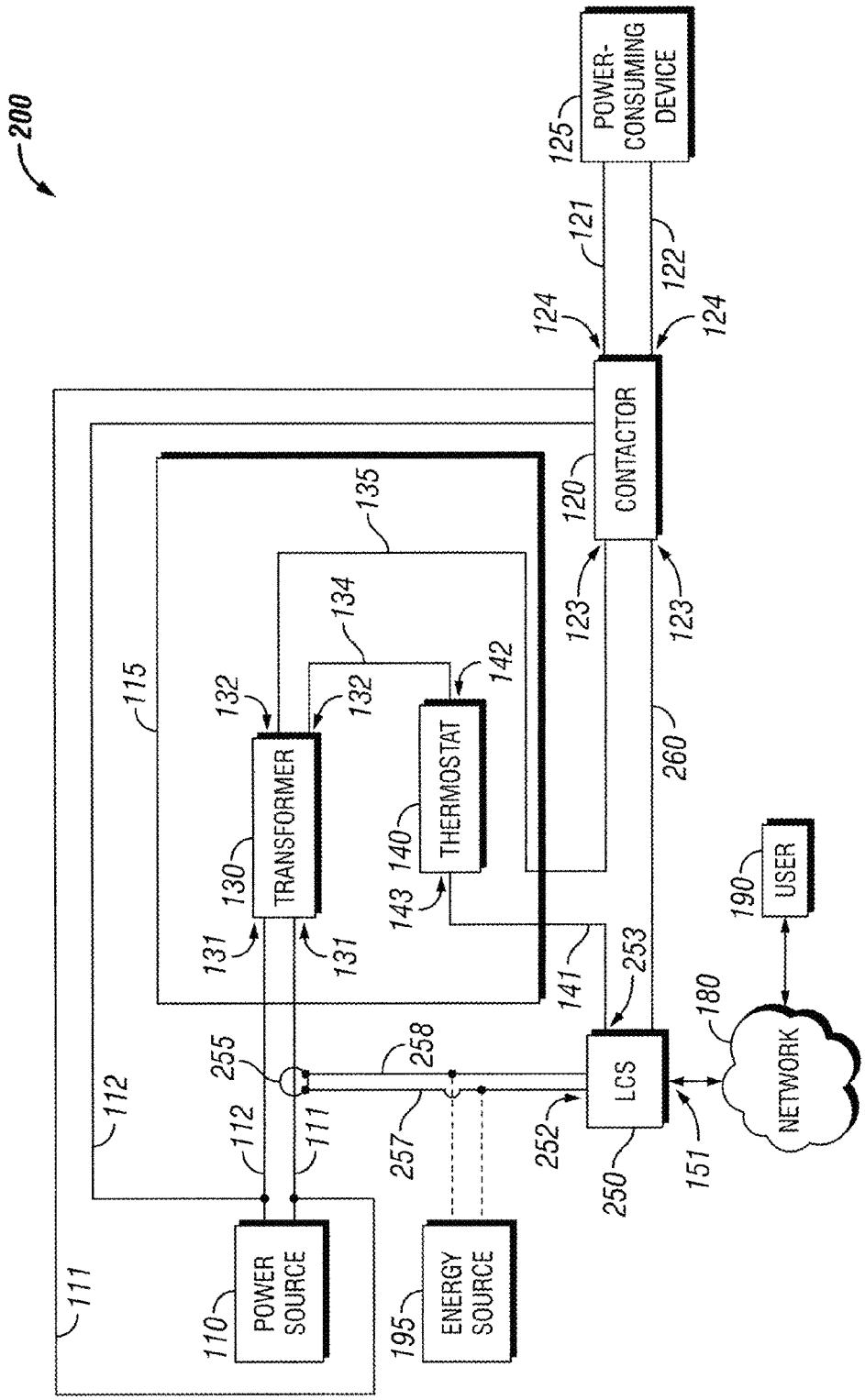
FIGS. 2A and 2B show block diagrams of systems that include a power-consuming device and an exemplary LCS in accordance with certain exemplary embodiments.
Figure 2B:
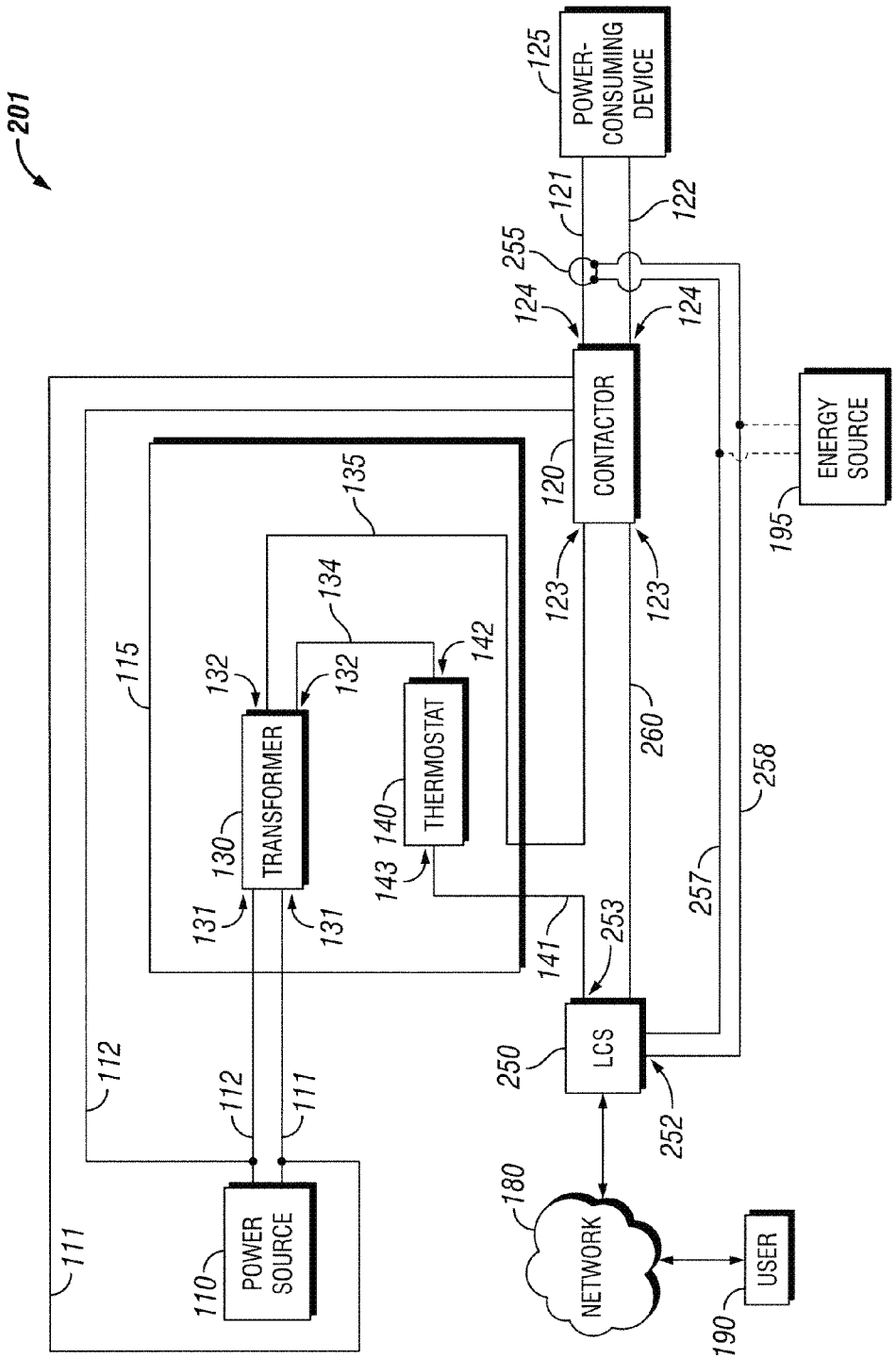

FIGS. 2A and 2B each shows a block diagram of a system that includes a power-consuming device 125 and an exemplary LCS 250 in accordance with certain exemplary embodiments. Specifically, FIG. 2A shows a block diagram of a system 200 that includes the power-consuming device 125 and an exemplary LCS 250 in accordance with certain exemplary embodiments. FIG. 2B shows a block diagram of a different system 201 that includes the power-consuming device 125 and the exemplary LCS 250, electrically coupled to different components than the components in FIG. 2A, in accordance with certain exemplary embodiments. In one or more embodiments, one or more of the components shown in FIGS. 2A and 2B can be omitted, repeated, and/or substituted. Accordingly, embodiments of energy harvesting LCSs should not be considered limited to the specific arrangements of components shown in FIGS. 2A and 2B.

The components of the system 200 in FIG. 2A and the system 201 of FIG. 2B are substantially the same as the corresponding components of the system 100 described above with respect to FIG. 1, except as discussed below. Referring now to FIGS. 1, 2A, and 2B, the power-receiving portions 252 of the LCS 250 in FIGS. 2A and 2B no longer directly receive a power signal from the power source 110. Instead, the LCS 250 is harvesting energy that flows through the conductor 111 from the power source 110 and/or is generated by an energy source 195. Specifically, the LCS 250 harvests a low voltage (e.g., less than 110 VAC) signal from a high voltage (e.g., at least 110 VAC) signal. As described herein, the harvested low voltage energy signal is called an energy signal.

In FIG. 2A, to accomplish this harvesting of energy from the power flowing through the voltage conductor 111, the LCS 250 is electrically coupled to a CT 255 that clamps around the voltage conductor 111. The CT 255 has two leads (lead 257 and lead 258) that bring the power harvested using the CT 255 to the power-receiving portion 252 of the LCS 250. The leads (lead 257 and lead 258) are a form of conductor, as described above. In certain exemplary embodiments, the voltage conductor 111 is physically separated from the neutral conductor 112 in order for a user not licensed as an electrician to install the CT 255 around the voltage conductor 111.

In addition, or in the alternative, the LCS 250 can also harvest energy from an energy source 195, which can be the same component or a different component than the power source 110. In such a case, the LCS 250 can harvest the energy signal using the CT 255 and/or any other suitable harvesting device (described above). The harvested energy signal can be received by the LCS 250 using one or more of a number of suitable devices, including but not limited to conductors (e.g., lead 257, lead 258), In exemplary embodiments, the CT 255 is any device that generates (harvests) a representation of a voltage, current, vibration, wind energy, solar energy, or other operating parameter of a power source 110 and/or one or more energy sources 195. When such a voltage, current, vibration, wind energy, solar energy, or other operating parameter flows through the one or more conductors (e.g., voltage conductor 111), the voltage, current, vibration, wind energy, solar energy, or other operating parameter can be called a line voltage. The exemplary CT 255 can be coupled (e.g., electrically, magnetically, communicably) to at least one conductor (e.g., the voltage conductor 111) and the LCS 250. For example, the CT 255 can be magnetically coupled to the voltage conductor 111, and electrically coupled to (capable of sending and receiving signals with respect to) the LCS 250.

In addition, or in the alternative, the LCS 250 can be coupled to the energy source 195 using any suitable means, as described above. The representation of the operating parameter (e.g., current, voltage) can be an electrical signal (e.g., analog signal, digital signal), an electro-mechanical signal, and/or any other suitable signal. The representation of the operating parameter may be a fractional amount of (proportionately smaller than) the operating parameter. The difference between the operating parameter and the representation of the operating parameter may be defined by a ratio. In one exemplary embodiment, the representation of the operating parameter is sent by the CT 255 to the LCS 250. The representation of the operating parameter can be called the energy signal.

In certain exemplary embodiments, the CT 255 includes a primary winding and a secondary winding. The primary winding and the secondary winding typically have a known ratio (e.g., 4000:5). As a result, in such a case, the secondary winding, to which the leads 257 and 258 are electrically coupled, generates a representation of the operating parameter that is 800 times less than the operating parameter. In addition, the CT 255 can transform an AC signal to a DC signal or a DC signal to an AC signal. As an example, if the voltage that flows through the voltage conductor 111 (and, thus, is measured by the primary winding of the CT 255) is 240 VAC, then the secondary winding of the CT 255 can generate 3.3 VDC, which flows through the leads 257, 258. The power flowing through the leads 257, 258 from the CT 255 can be called a current transformed signal, which is a form of an energy signal.

The CT 255 can partially or completely surround the conductor (e.g., the voltage conductor 111) from which the CT 255 harvests power. In order to completely surround the conductor, the CT 255 can have one or more portions that are moveable and/or removable to allow the CT 255 to be put in the proper position and subsequently mechanically coupled back together. For example, the CT 255 can be a clamp-on style, where actuating a lever (for example, on the handle of the CT 255) opens the clamp enough to allow the CT 255 to surround the conductor. Once in position, the lever is released, allowing the clamp to close around the conductor.

The CT 255 may also be capable of harvesting power from one or more voltage conductors 111, the neutral conductor 112, some other conductor, or any combination thereof. The exemplary CT 255 can be one or more of a number of other measurement devices and/or transducers, including, but not limited to, a Hall effect sensor, a potential transformer (also called a voltage transformer), an antenna, and an electrometer. A potential transformer has similar characteristics to the current transformer, except the operating parameter detected by the potential transformer, as well as the representation of the operating parameter generated by the potential transformer, is a voltage. A Hall effect sensor may be used to receive and/or generate current representative of the current flowing through the power conductor 111.

The power harvested by the CT 255 from the power source 110 and/or harvested from the energy source 195 and delivered to the LCS 250 generates the power required to operate one or more components (e.g., the hardware processor) of the LCS 250. Part of the LCS 250 in FIG. 2A is electrically coupled to the thermostat 140 and the contactor 120. Specifically, conductor 141 electrically couples the output portion 143 of the thermostat 141 to one end of the relay contact portion 253 of the LCS 250. In addition, conductor 260 electrically couples the other end of the relay contact portion 253 of the LCS 250 to the input portion 123 of the contactor 120. More detail as to the components of the LCS 250 shown in FIG. 2A are described below with respect to FIG. 3A.

In certain exemplary embodiments, as shown in FIGS. 2A and 2B, the transformer 130 and the thermostat 140 can be part of, or considered to be, a single component 115 or unit 115. For example, if the system 200 of FIG. 2A is for air conditioning, the unit 115 can be an air conditioning unit. The unit 115 can be physical (e.g., a single housing in which the transformer 130 and the thermostat 140 are disposed) or virtual, where the transformer 130 and the thermostat 140 are communicably and/or electrically coupled using wires (e.g., conductors) and/or wireless technology.

The system 201 of FIG. 2B is substantially similar to the system 200 of FIG. 2A with the following exceptions. Referring now to FIGS. 1-2B, the LCS 250 in FIG. 2B is harvesting energy that flows through the voltage conductor 121 that directly couples the contactor 120 to the power-consuming device 125. The system 201 of FIG. 2B differs from the system 200 of FIG. 2A in that the power-receiving portions 252 of the LCS 250 are harvesting energy from a different source of power of the system 201. Specifically, the CT 255 in FIG. 2B is harvesting energy from the voltage conductor 121 that electrically couples the contactor 120 to the power-consuming device 125. In other words, the CT 255 is clamped around the voltage conductor 121 and is electrically coupled to the power-receiving portion 252 of the LCS 250 using leads 257 and 258.

In the configuration shown in FIG. 2B, the conductor 121 is not typically bundled with other conductors, and so the CT 255 can easily be clamped around the voltage conductor 121. In such a case, the exemplary LCS 250 an be installed without using a licensed electrician. More detail as to the components of the LCS 250 shown in FIG. 2B are described below with respect to FIG. 3B.

In addition, or in the alternative, the exemplary LCS 250 of FIGS. 2A and 2B can harvest energy from one or more of a number of other sources, such as energy source 195. In such a case, the LCS 250 may or may not include a CT 255 to harvest such energy. Examples of the energy source 195 can include, but are not limited to, power generated by a photovoltaic (PV) solar panel, power generated by a wind-powered turbine, wind energy, solar energy, geothermal energy, steam energy, energy from vibrations, an power generated by a piezoelectric material. For example, the LCS 250 can include one or more PV solar panels and associated equipment (e.g., inverter, transformer, converter) that are directly electrically coupled to the LCS 250 and provide energy harvested from the sun to operate the LCS 250. In other words, energy harvested from the energy source 195 by the LCS 250 can come from one or more of a number of sources, which may or may not include power flowing through a conductor (e.g., conductor 111, conductor 121) that feeds the contactor 120 and/or the power-consuming device 125.

In certain exemplary embodiments, the energy source 195 is coupled to the power source 110. In addition, or in the alternative, energy generated by the energy source 195 (and either directly or indirectly harvested by the LCS 250) can be delivered to some other device, aside from the power-consuming device 125, using any suitable medium (e.g., conductor 109, a pipe, a compressor). In some cases, the energy source 195 can be the same as the power source 110. In such a case, the source of energy would be at such a relatively low energy level as to not require the services of a licensed electrician and/or other professional to install the LCS 250.

Figure 3A:
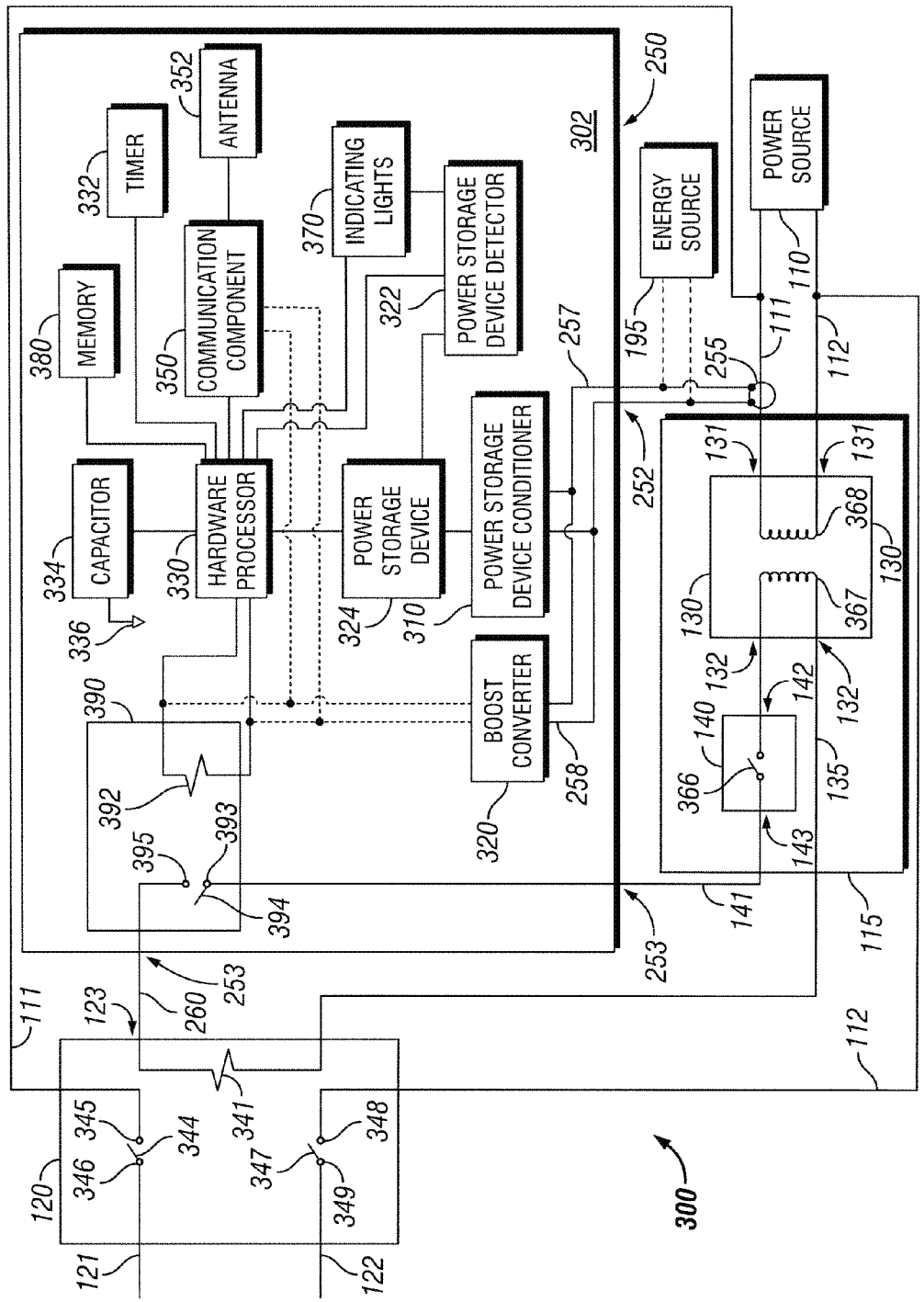
FIGS. 3A and 3B each shows a circuit diagram of an exemplary LCS in accordance with certain exemplary embodiments.
Figure 3B:
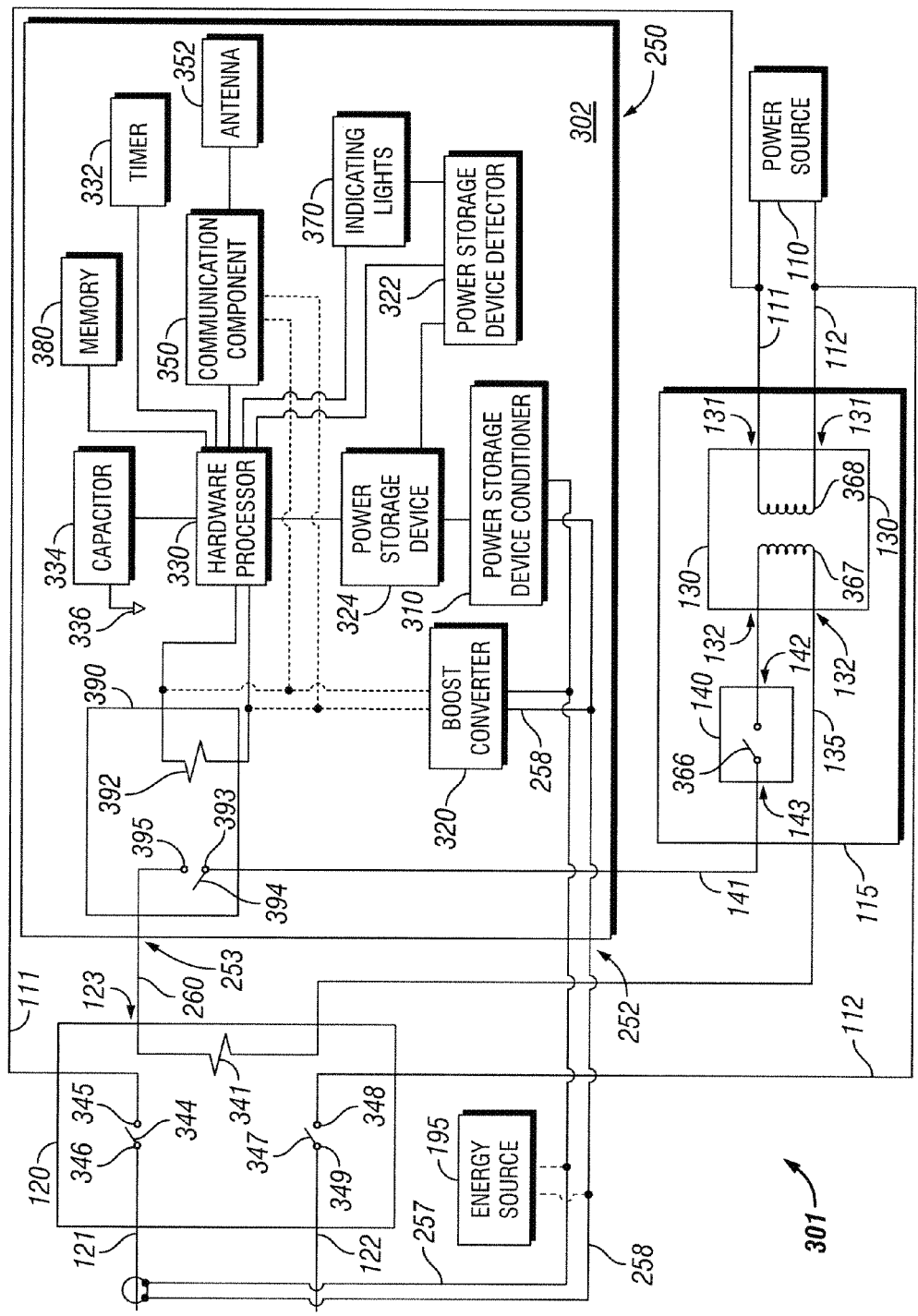

FIGS. 3A and 3B each shows a circuit diagram of an exemplary LCS 250 in accordance with certain exemplary embodiments. Specifically, the circuit diagram 300 of FIG. 3A shows a portion of the system 200 of FIG. 2A. The circuit diagram of FIG. 3B shows a portion of a different system 301 that includes the exemplary LCS 250, electrically coupled to different components than the components in FIG. 3A, in accordance with certain exemplary embodiments. The circuit diagram 300 includes the LCS 250, the power source 110, the energy source 195, the contactor 120, the thermostat 140, and the transformer 130. The LCS 250 of FIGS. 3A and 3B each includes a housing 302, inside of which are disposed a power storage device conditioner 310, a boost converter 320, a hardware processor 330, a timer 332, a capacitor 334, a communication component 350, a relay 390, one or more indicating lights 370, a power storage device 324, and an optional power storage device indicator 322. In certain embodiments, one or more of the components shown in FIGS. 3A and 3B can be combined, omitted, repeated, and/or substituted. Accordingly, embodiments of the exemplary LCS 250 should not be considered limited to the specific arrangements of components shown in FIGS. 3A and 3B.

Referring to FIGS. 1-3A, a schematic of the contactor 120 in FIG. 3A shows the coil 341 and a pair of contacts (contact 344 and contact 347), where the coil 341 and each contact 344, 347 are substantially similar to the corresponding components described above with respect to FIG. 1. In this case, the contacts (contact 344 and contact 347) are normally-open (in the disabled state). In addition, a schematic of the transformer 130 shows the winding 368 of the primary side 131 and the corresponding winding 367 of the secondary side 132.

In certain exemplary embodiments, the housing 302 is a type of enclosure that houses one or more of the components of the LCS 250. The housing 302 can have a movable portion that allows a user 190 to access the one or more components of the LCS 250 located inside the housing 302. The housing can be made of one or more of a number of suitable materials, including but not limited to plastic, metal, glass, and rubber. The housing 302 can be mounted in one or more locations when connected to the system 300. For example, the housing 302 can be mounted in or near a compressor unit of an A/C system. As another example, the housing 302 can be mounted in or near an air handler (e.g., furnace) of a HVAC system. In such a case, another power source (aside from the voltage conductor 111 that electrically couples the power source 110 to the primary side 131 of the transformer 130), such as the energy source 195, can be used to provide an energy signal (either constantly or intermittently) to the LCS 250 through energy harvesting using the CT 255 and/or some other energy harvesting device.

In certain exemplary embodiments, the power storage device conditioner 310 provides a charge to the power storage device 324. The power storage device conditioner 310 is electrically coupled to the leads 257, 258 of the CT 255 to receive the power harvested by the CT 255. The power storage device conditioner 310 can manipulate the harvested power (e.g., applies transformation, inversion, conversion, and/or any other charge transforming method, in increasing or decreasing voltages and/or currents) so that the power is in the proper form and level to be received by the power storage device 324. The power storage device conditioner 310 can be internal to the LCS 250 (located within the housing 302). Alternatively, the power storage device conditioner 310 can be located outside the housing 302 and operatively coupled to the power storage device 324.

In certain exemplary embodiments, the power storage device conditioner 310 provides a trickle charge to the power storage device 324. A trickle charge can be a continuous or periodic amount of power delivered by the power storage device conditioner 310 to the power storage device 324. The trickle charge charges the power storage device 324. The amount of power in a trickle charge is a lower amount relative to constant power provided to the power storage device 324 without a power storage device conditioner 310. Put another way, the trickle charge is used to maintain an existing charge of the power storage device 324, which requires fewer resources (less energy) than fully powering the power storage device 324. Consequently, the power storage device 324 can provide power to the components of the LCS 250 whether power is harvested by the CT 255 or not. When power is harvested by the CT 255, the power storage device 324 stays at or near a fully-charged state using exemplary embodiments described herein.

The amount of trickle charge can vary. For example, the trickle charge can be a few milliamps, regardless of the rated voltage. As another example, the trickle charge can be 2 A at a rated voltage of 48 V. As yet another example, the trickle charge can be 9.6 A at a rated voltage of 24V. In certain exemplary embodiments, the amount of trickle charge can be less than the maximum allowed for installation by someone other than a licensed professional.

In certain exemplary embodiments, when a trickle charge is provided by the power storage device conditioner 310 to the power storage device 324, the trickle charge is provided during normal operating conditions and/or when the power storage device 324 not activated. The amount of trickle charge delivered by the when the power storage device 324 not activated to the power storage device 324 is typically determined by one or more of a number of factors, including, but not limited to, the configuration and number of batteries 324, the type of wiring used, the distance between the power storage device conditioner 310 and the power storage device 324, and the capacity of the power storage device 324. In certain exemplary embodiments, the trickle charge is provided as DC power (e.g., 48 VDC, 200 mA), while in other examples the trickle charge is provided as AC power.

In certain exemplary embodiments, the boost converter 320 is internal to the LCS 250 and is operatively coupled to the hardware processor 330, the coil 392 of the relay 390, and/or one or more other components (e.g., the communication component 350) of the LCS 250. The boost converter 320 is also electrically coupled to the leads 257, 258 of the CT 255 and to the power storage device conditioner 310. The boost converter 320 (also called a step-up converter) can be a DC-to-DC converter with an output voltage and/or current that is greater than the input voltage and/or current.

In certain other exemplary embodiments, the boost converter 320 can be a step-down converter (output that is less than the input) and can transfer charge from DC-to-AC, AC-to-DC, and/or AC-to-AC, depending on what component (e.g., the coil 392 of the relay 390) is electrically coupled to the boost converter 320 and the electrical needs of such component. The amount of power output from the boost converter 320 can be any amount suitable to operate the one or more components electrically coupled to the output of the boost converter 320.

The boost converter 320 can also be called a switched-mode power supply (SMPS). The boost converter 320 can include one or more of a number of discrete components (e.g., inductor, diode, transistor, capacitor), one or more integrated circuits, software that is executed on a controller or similar device, and/or any combination thereof. As an example, the leads 257, 258 of the CT 255 can carry a voltage of 3.3 VDC. The boost converter 320 can be a 1:1.5 step-up converter (DC-to-DC), and so the output of the boost converter 320 in this case is approximately 5.0 VDC. The boost converter 320 can be physically separate from the other components of the LCS 250 and/or internal within the housing 302 of the LCS 250.

The hardware processor 330 receives power from the power storage device 324 and is communicably coupled to the timer 332, the communications component 350, the memory 380, the indicating lights 370, the capacitor 334, and the optional boost converter 320. In general, one or more instructions is received by the communication component 350 from a user 190. The hardware processor 330 interprets, using software stored in the memory 380, such instructions and determines whether a control event is required. If a control event is required, the hardware processor 330 (at times in conjunction with the optional boost converter 320) energizes a coil 392 of the relay 390, which closes (enabled state) the contact 394 of the relay 390. If there is no control event required, then the microprocessor does not energize the coil 392 of the relay 390, which leaves the contact 394 in a normally-open (disabled) state.

The exemplary hardware processor 330 within the housing 302 of the LCS 250 is configured to execute software in accordance with one or more exemplary embodiments. Specifically, the hardware processor 330 is configured to execute the instructions used to operate the LCS 250, including any of its components, described above and shown in FIG. 3A, as well as software used by a user 190. The exemplary hardware processor 330 is an integrated circuit, a central processing unit, a multi-core processing chip, a multi-chip module including multiple multi-core processing chips, or other hardware processor. The hardware processor 330 can be known by other names, including but not limited to a computer processor, a microcontroller, a microprocessor, and a multi-core processor.

In one or more exemplary embodiments, the hardware processor 330 is configured to execute software instructions stored in the memory 380 of the LCS 250. The exemplary memory 380 can include one or more cache memories, main memory, and/or any other suitable type of memory. In certain exemplary embodiments, the memory 380 is discretely located within the housing 302 relative to the hardware processor 330. In certain configurations, the memory 380 can also be integrated with the hardware processor 330. The hardware processor 330 can be integrated into one or more mixed signal integrated circuits. In such a case, the profile and/or cost of the hardware processor 330 can be reduced.

The exemplary timer 332 can be part of the hardware processor 330 or a separate component. The timer 332 keeps clock time and/or tracks one or more periods of time, such as an amount of time since receiving instructions to initiate a control event or an amount of time since receiving control power from the thermostat 140. The exemplary timer 332 is able to track one or more time periods concurrently. The exemplary timer 332 communicates times to the hardware processor 330. The timer 332 also receives instructions from the hardware processor 330 to start tracking one or more time periods and/or time delays. For example, the timer 332 notifies the hardware processor 330 when a certain amount of time has lapsed, such as the length of time that a control event has been active or when the hardware processor 330 should get out of limited mode to determine whether any instructions with regard to a control event are pending. The timer 332 can be a physical timer, separate from the hardware processor 330, or software/firmware installed on the hardware processor 330.

In certain exemplary embodiments, the timer 332 receives power from the hardware processor 330, the power storage device 324, and/or the boost converter 320 so that the timer 332 is always receiving power, even when the remaining components of the LCS 250 are not receiving power because there is no power being harvested from the voltage conductor 111 by the CT 255. The timer 332 is communicably coupled to the hardware processor 330 to communicate clock time and/or one or more periods of time measured by the timer 332.

In certain exemplary embodiments, the power storage device 324 is electrically coupled to the hardware processor 330, the timer 332, and/or one or more other components (e.g., indicating lights 370, communication component 350) of the LCS 250. The power storage device 324 can provide power to the hardware processor 330 and the communication component 350 so that such components of the LCS 250 are always operating, even if because there is no energy signal being harvested by the CT 255 (from, for example, conductor 111, conductor 121, and/or the energy source 195). The power storage device 324 can be disposed inside of the housing 302, affixed to the housing 302, or placed in a location remote from the housing 302. The power storage device 324 can be fixedly or removably coupled to the housing 302.

When the power storage device 324 is removably coupled to the housing 302, the power storage device 324 can be replaced. The power storage device 324 can use one or more of a number of types of cell, including but not limited to fixed, rechargeable, nickel cadmium, lithium, nickel metal hydride. The power storage device 324 can be any type of power or energy storage device, including but not limited to a battery, a super capacitor, a fuel cell, and a flywheel. The power storage device 324 can be of any suitable capacity. For example, the power storage device 324 can be a 6V 1.1 Ah (amp-hour) power storage device.

The power storage device 324 can be electrically coupled to the hardware processor 330, the timer 332 (at times through the hardware processor 330) and any other components of the LCS 250 using a wired and/or wireless technology. The power storage device 324 can be rechargeable or non-rechargeable. For example, if the power storage device 324 is rechargeable, when power is fed to the power storage device conditioner 310 from the CT 255, a trickle charge can be sent from the power storage device conditioner 310 to the power storage device 324 to charge the power storage device 324. In certain exemplary embodiments, the power storage device 324 can also be electrically coupled to the optional power storage device detector 322.

The optional power storage device detector 322 can be operatively coupled to the power storage device 324 and the hardware processor 330. The power storage device detector 322 can determine the amount of charge that the power storage device 324 has remaining and communicate this information to the hardware processor 330. The hardware processor 330 can then use this information to communicate the status of the power storage device 324 (e.g., using one or more indicating lights 370) to a user 190. The power storage device detector 322 can operate continuously or at select times (e.g., when the power storage device conditioner 310 receives power from the CT 255, every 30 minutes, upon receiving an instruction from the hardware processor 330).

In certain exemplary embodiments, the capacitor 334 is electrically coupled to the hardware processor 330. The capacitor 334 can also be electrically coupled to the timer 332. The capacitor 334 can be any type of capacitor (e.g., electrolytic capacitor, electric double-layer capacitor) having one of a number of different capacitances (e.g., 3 kF, 1 µF). The capacitor 334 can be used for one or more of a number of purposes, including but not limited to storing power for use by the hardware processor 330 and/or the capacitor 332, and to smooth power delivered to the microprocessor 330. The other end of the capacitor 334 can be electrically coupled to ground 336.

The indicating lights 370 are electrically coupled to the hardware processor 330. The indicating lights 370 can be one or more light sources that are used to indicate one or more statuses of a component of the LCS 250 and/or a mode of operation of the LCS 250. The indicating lights 370 can be any type of light source, including but not limited to a light-emitting diode (LED), or organic LED, and an incandescent bulb. An indicating light 370 can radiate one or more of a number of colors. An indicating light 370 can be constantly illuminated, illuminated for certain period of time, or illuminated during certain events.

For example, an indicating light 370 can illuminate when the power storage device 324 is running low on power, as determined by the power storage device detector 322. As another example, an indicating light 370 can illuminate red when there is a control event occurring and green when no control event is occurring. An indicating light 370 can be mounted on the housing 302 (so that the indicating light 370 is visible from outside the housing 302), mounted inside the housing 302 (so that the indicating light 370 is visible when a portion of the housing 302 is removed or through a port on the surface of the housing 302), or in a location (e.g., a control room, an indicating panel) that is remote from the housing 302.

The relay 390 is substantially similar to the contactor 120, as described above with respect to FIG. 1. The relay 390 includes a coil 392 and a relay contact 394. The coil 392 of the relay 390 can be electrically coupled to the hardware processor 330 and/or the boost converter 320. The relay contact 394 of the relay 390 is normally open (disabled) when the coil 392 is not energized. The relay contact 394 has an input portion 393 and an output portion 395. The input portion 393 of the relay contact 394 is electrically coupled to the output portion 143 of the thermostat 140. The output portion 395 of the relay contact 394 is electrically coupled to the input portion 342 of the coil 341 of the contactor 120 20.

The first relay contact 344 and a second relay contact 347 of the contactor 120 can operate in parallel. As shown in FIG. 3A, the first relay contact 344 and the second relay contact 347 of the contactor 120 are normally open (disabled) when the coil 341 is not energized. The first relay contact 344 and a second relay contact 347 of the contactor 120 both become enabled (closed) at substantially the same time when the coil 341 is energized. The output portion 346 of the first relay contact 344 and the input portion 349 of the second relay contact 347 are electrically coupled to the power-consuming device 125. The output portion 348 of the second relay contact 347 is electrically coupled to the power source 110 using conductor 112. The input portion 345 of the first relay contact 344 is electrically coupled to the power supply 110 using conductor 111.

In certain exemplary embodiments, the communication component 350 of the LCS 250 sends signals to and receives signals from a user 190. Specifically, the communication component 350 receives signals regarding a demand response instruction (e.g., a control event, a software upgrade) from a demand response entity. In addition, the communication component 350 can send signals to the demand response entity providing information (e.g., status) regarding a demand response instruction.

The communication component 350 can communicate with one or more user 190s using one or more communication protocols and/or technologies. Examples of such communication protocols and/or technologies include, but are not limited to, radio frequency identification (RFID), Zigbee, Wi-Fi, the Internet, and radio data system (RDS). As an example, the communication component 350 can send and receive signals with a user 190 using radio frequency (RF) radio signals. In certain exemplary embodiments, the communication component 350 can include an antenna 352 to improve the signals sent and received with the user 190. The communication component 350 can communicate with the user 190 by following one or more of a number of communication protocols used by the user 190. The communication component 350 can communicate using wired or wireless technology.

The communication component 350 is communicably coupled to the hardware processor 330. The signals received by the communication component 350 are delivered to the hardware processor 330, which translates such signals into instructions. The signals sent by the communication component 350 are generated by the hardware processor 330 and formatted to be sent according to the appropriate communication protocol for the user 190. Some or all of the communication component 350 can be mounted on the housing 302 (e.g., the antenna 352 protruding from the housing 302), mounted inside the housing 302, or in a location (e.g., a roof top) that is remote from the housing 302.

At times, the communication component 350 and/or the hardware processor 330, in certain exemplary embodiments, operate in a limited mode. A limited mode of operation for the communication component 350 allows the communication component 350 and/or the hardware processor 330 to perform minimum functions during times of relatively low usage to conserve the charge on the power storage device 324. Examples of a limited mode is a sleep mode, an idle mode, an off mode with occasional and brief on periods, a reduced mode, and a standby mode. The communication component 350 and/or the hardware processor 330 can enter into the limited mode of operation automatically (e.g., after 30 minutes of receiving the most recent instruction from the user 190), based on an instruction from the hardware processor 330, when the power storage device detector 322 determines that the charge on the power storage device 324 is below a threshold charge level, based on a software instruction, based on some other event, or any combination thereof.

Because the communication component 350 can be idling (operating in a limited mode) and not always able to receive a signal, the user 190 attempting to communicate with the LCS 250 should be configured in a way that allows the signals sent by the user 190 to be received by the communications component 350 when the communications component 350 is enabled or activated (is no longer operating in a limited mode). For example, the user 190 can be configured to send its signals more frequently and repeat sending such signals until the user 190 receives confirmation that the communications component 350 has received such signals.

As another example, the user 190 can be configured to have a buffer sufficient to hold any signals that have not been received and release such signals from the buffer when the communication component 350 has indicated to the user 190 that the communication component 350 is enabled. Alternatively, the communication component 350 can be configured to receive a signal from a user 190 while the communication component 350 is operating in the limited mode. In such a case, the signal enables or activates the communication component 350 in addition to providing information to the communication component 350 about a control event.

Each time power (an energy signal) is harvested (as by the CT 255) and sent to the LCS 250 and/or each time that the hardware processor 330 is taken out of the limited mode of operation, the hardware processor 330 can implement a configurable delay (e.g., a few seconds) when initializing. During this delay, the hardware processor 330 instructs the communication component 350 to search for signals associated with a control event. If there is no control event that is to be executed immediately, when the configurable delay is over, the hardware processor 330 allows the power from the power storage device 324 to flow through the LCS 250 to the contactor 120 and, ultimately, the power-consuming device 125. In certain exemplary embodiments, during the configurable delay, the hardware processor 330 does not deliver power to the coil 392 of the relay 390, and so the contact 394 of the relay 390 remains open (disabled). The delay can be tracked by the timer 332 or by the hardware processor 330.

The system 301 of FIG. 3B is substantially similar to the system 300 of FIG. 3A with the following exceptions. The system 301 of FIG. 3B differs from the system 300 of FIG. 3A in that the power-receiving portions 252 of the LCS 250 is electrically coupled to different components and/or portions of the system 301. Specifically, the power-receiving portions 252 of the LCS 250 in FIG. 3B are harvesting an energy signal from power that flows through the voltage conductor 121 that directly couples the contactor 120 to the power-consuming device (not shown in FIG. 3B). The system 301 of FIG. 3B differs from the system 300 of FIG. 3A in that the power-receiving portions 252 of the LCS 250 are harvesting energy from a different source of power of the system 301. Specifically, the CT 255 in FIG. 3B is harvesting energy from the voltage conductor 121. In other words, the CT 255 is clamped around the voltage conductor 121 and is electrically coupled to the power-receiving portion 252 of the LCS 250 using leads 257 and 258.

Figure 4:
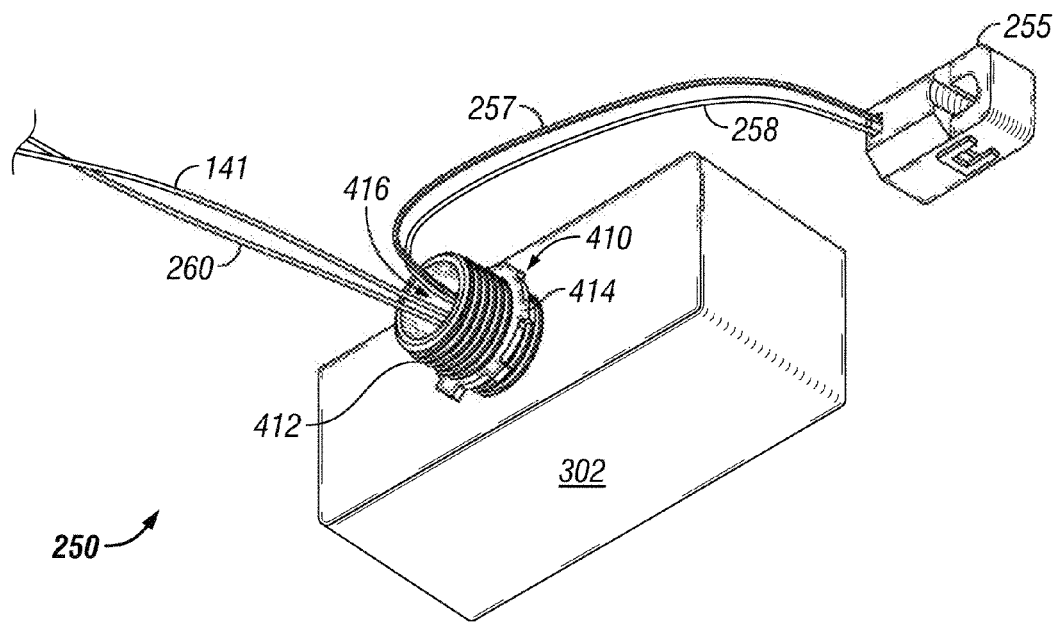
FIG. 4 shows a perspective view of an exemplary LCS in accordance with certain exemplary embodiments.

FIG. 4 shows a perspective view of an exemplary LCS 250 in accordance with certain exemplary embodiments. Referring to FIGS. 1-4, the LCS 250 includes the CT 255 that is electrically coupled to the housing 302 by lead 257 and lead 258. Lead 257 and lead 258 enter through a cavity 416 formed by a protrusion 410 that includes one or more coupling features. In this example, the coupling features include mating threads 412 disposed along the outer surface of the protrusion 410 and a threaded nut 414 that is threadably coupled to the outer surface of the protrusion 410 using the mating threads 412. In addition, or in the alternative, one or more other types of coupling features (e.g., snap fittings, slots, compression fittings) can be used.

The protrusion 410 and accompanying coupling features can be used to mount the housing 302 of the LCS 250 to a surface (e.g., a wall, an enclosure, an air conditioning unit, a furnace). In addition, the LCS 250 of FIG. 4 shows conductor 141 and conductor 260 traversing the cavity 416 of the protrusion 410 and extending away from the housing 302 toward the thermostat 140 and the contactor 120, respectively (both not shown).

Figure 5:
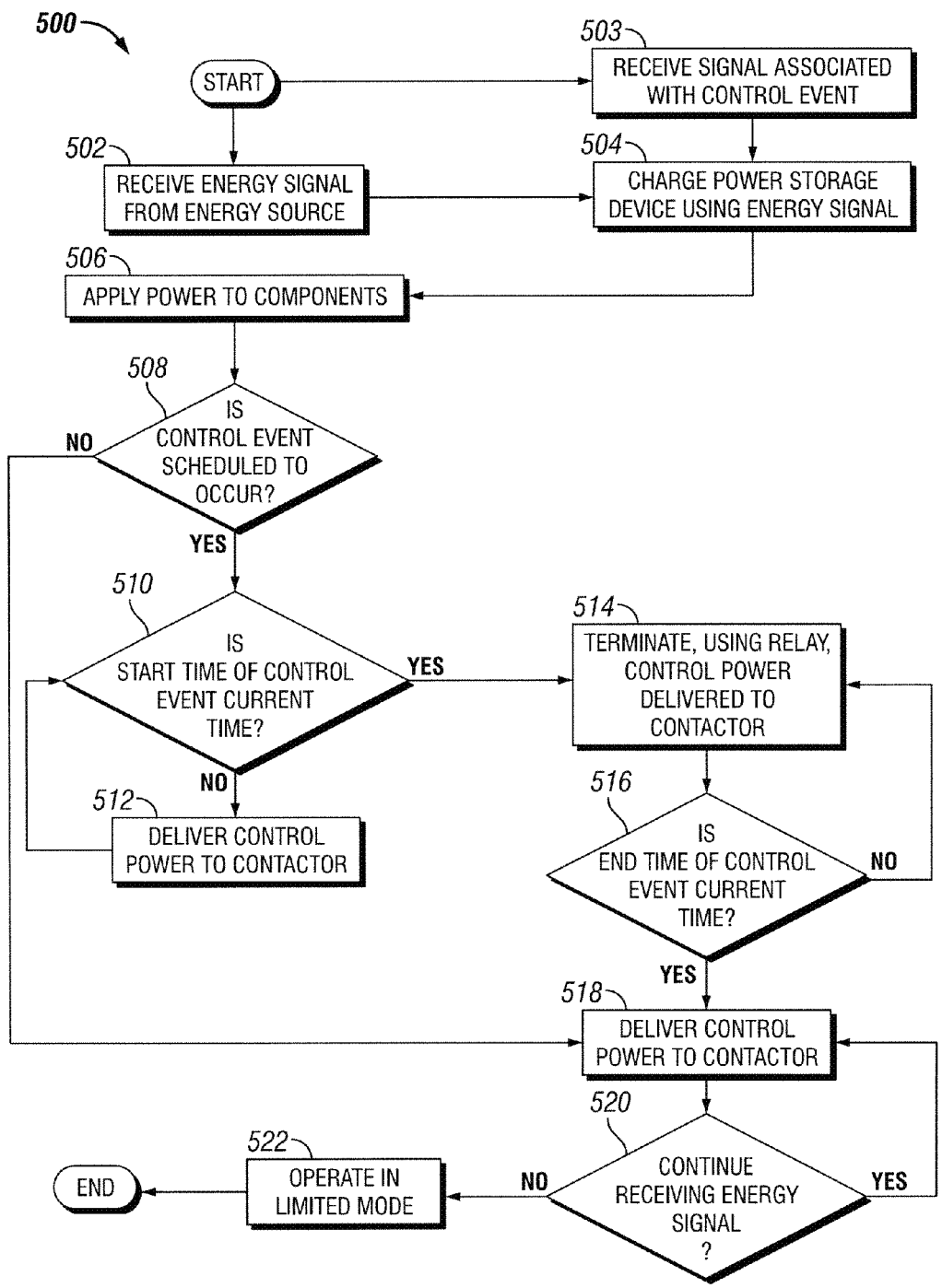
FIG. 5 shows a flowchart of a method for controlling power delivered to a power-consuming device in accordance with certain exemplary embodiments.

FIG. 5 shows a flowchart of a method 500 for controlling power delivered to a power-consuming device in accordance with certain exemplary embodiments. While the various steps in these flowcharts are presented and described sequentially, one of ordinary skill will appreciate that some or all of the steps may be executed in different orders, may be combined or omitted, and some or all of the steps may be executed in parallel. Further, in certain exemplary embodiments, one or more of the steps described below may be omitted, repeated, and/or performed in a different order.

In addition, a person of ordinary skill in the art will appreciate that additional steps, omitted in FIG. 5, may be included in performing these methods. Accordingly, the specific arrangement of steps shown in FIG. 5 should not be construed as limiting the scope. In addition, a particular computing device, as described, for example, in FIG. 6 below, may be used to perform one or more of the steps for the method 500 described below.

Referring now to FIGS. 1-5, one exemplary method 500 begins at the START step and continues to step 502. In step 502, an energy signal is received from an energy source 195. The energy source 195 can include one or more of a number of sources, including but not limited to the power source 110, a PV solar panel, a wind-powered generator, a steam generator, and a piezoelectric device. The energy signal can be received by the power storage device conditioner 310 and, optionally, the boost converter 320 of the LCS 250. The energy signal can be received from the energy source 195 using one or more of a number of harvesting devices, including but not limited to a conductor (e.g., conductor 109), a pipe, a CT 255, and a compressor. If the energy signal is a current transformed signal, the current transformed signal can be received from a CT 255, where the CT 255 harvests the current transformed signal from a line voltage flowing through a conductor (e.g., voltage conductor 111, conductor 113). The energy signal can be received by the power storage device conditioner 310 through one or more leads (e.g., leads 257, 258).

In certain exemplary embodiments, the energy signal is received from the energy source 195 for a limited period of time. Such a period of time can depend on one or more of a number of factors, including but not limited to a state of a master control switch for the power-consuming device 125 and the current value of a parameter compared to a threshold value of the parameter. For example, the energy signal is harvested by the CT 255 from the voltage conductor 111 for as long as an ambient temperature exceeds a threshold temperature. Such a comparison can be made by the thermostat 140. The energy signal can be received continuously by the LCS 250 for the period of time. The energy signal can be constant, periodic, or have any type of regular pattern.

In certain exemplary embodiments, in addition or in the alternative, rather than receiving an energy signal, the method 500 begins at the START step and continues to step 503. In step 503, an instruction signal associated with a control event is received. The signal associated with the control event can be received from a user 190. The instruction signal associated with the control event can be received by the communication component 350. In such a case, the hardware processor 330 and/or the communication component 350 can be operating in a limited mode. In certain exemplary embodiments, the communication component 350 (and, subsequently, the hardware processor 330) stop operating in a limited mode and start operating in a regular mode when the instruction signal associated with a control event is received by the communication component 350 from a user 190.

Alternatively, the communication component 350 (and, in some cases, also the hardware processor 330) stops operating in a limited mode and starts operating in a regular mode for a limited time to see if an instruction signal associated with a control event is sent by a user 190. In such a case, the change in operation of the communication component 350 from the limited mode to the regular mode can be based on one or more of a number of events, including but not limited to the occurrence of an event (e.g., the passage of time), a manual instruction from a user 190, the day of the week, and the month of the year.

For example, the timer 332 can send a signal to the hardware processor 330 at a specific time every day (e.g., noon). Such a signal causes the hardware processor 330 to operate in a one type of limited mode (e.g., check for instruction signals) from a different type of limited mode (e.g., sleep mode). The timer 332 can limit the hardware processor 330 as to the amount of time that the hardware processor 330 (with the assistance of the communication component 370) searches for an instruction signal. If, in the allotted time determined by the timer 332, no instruction signal is found, then the hardware processor 330 returns to its previous limited (e.g., sleep) mode.

In any case, when the communication component 350 receives the instruction signal associated with a control event, the communication component 350 sends an activation signal to the hardware processor 330, which causes the hardware processor 330 to begin operating in a normal mode. In such a case, the hardware processor 330 notifies the power storage device 324, and the process proceeds to step 504.

In step 504, the energy signal is used to charge a power storage device 324. If the energy harvesting device is the CT 255, then the power storage device conditioner 310 receives the current transformed signal (generically, the energy signal) from the CT 255 and sends a charge, based on the current transformed signal, to the power storage device 324. The charge sent by the power storage device conditioner 310 to the power storage device 324 can be a trickle charge.

In step 506, power from the power storage device 324 is applied to a number of components of the LCS 250. Specifically, the power storage device 324 applies power to a number of components associated with the LCS 250. Examples of such components can include, but are not limited to, the hardware processor 330. In turn, the hardware processor 330 can apply power (either the same power or power that has been altered by a charge changing device, such as the boost converter 320) to other components that are electrically coupled to the hardware processor 330, including but not limited to the communication component 350, the timer 332, the coil 392 of the relay 390, the indicating lights 170, and the optional power storage device detector 322.

When the power storage device 324 of the LCS 250 applies the power to the hardware processor 330 and/or other components of the LCS 250, it can do so in a number of steps. For example, the power storage device 324 can initially activate the communications component 350 and the hardware processor 330. Once activated, the communications component 350 can search for and receive any instruction signals associated with a control event. The hardware processor 330 can then receive corresponding activation signals associated with a control event from the communications component 350. In addition, while the communications component 350 is receiving instruction signals associated with a control event, the hardware processor 330 can be activating one or more other components of the LCS 250. Examples of such other components can include, but are not limited to, one or more indicating lights 370, the capacitor 334, and the power storage device detector 322.

In step 508, a determination is made as to whether a control event is scheduled to occur. The determination as to whether a control event is scheduled to occur is made by the hardware processor 330 using the communication component 350. In certain exemplary embodiments, while the hardware processor 330 is being initialized (after receiving power initially), a delay can be incorporated into the power storage device 324, the hardware processor 330, or some other component of the LCS 250 to prevent any power from being sent to the power-consuming device 125 until the hardware processor 330 determines whether a control event is scheduled to occur. If a control event is scheduled to occur, the process proceeds to step 510. If a control event is not scheduled to occur, the process proceeds to step 518.

In step 510, a determination is made as to whether the start time of the control event is the current time. The control event has a start time and an end time. While the end time of the control event may not be known when the control event is issued, the start time generally is known when the control event is issued. The start time is when the control event begins. The start time can be in terms of a clock time (e.g., 9:30 a.m. Central standard time), an amount of time (e.g., the control event begins in 10 minutes), immediately (no time), or some other suitable form of time. In certain exemplary embodiments, the start time that the control event is scheduled to occur is determined by the hardware processor 330 using the timer 332. The current time is determined by the timer 332 and communicated to the hardware processor 330. The hardware processor compares the start time and the current time. If the hardware processor 330 determines that the start time of the control event is the current time, then the process proceeds to step 514. If the hardware processor 330 determines that the start time of the control event is not the current time, then the process proceeds to step 512.

In step 512, control power is delivered to the contactor 120. Specifically, control power is delivered to the coil 341 of the contactor 120. In certain exemplary embodiments, the hardware processor 330 allows control power to flow to the power-consuming device 125. For example, the hardware processor 330 sends a voltage (or allows the power storage device 324 to send a voltage) to the coil 392 of the relay 390 of the LCS 250. When the coil 392 of the relay 390 is energized, the normally-open contact 394 of the relay 394 is closed (enabled), which allows the control power to flow to the coil 341 of the contactor 120 (which, in turn, allows a power signal to flow to the power-consuming device 125). Because the power-consuming device 125 cannot operate unless it receives the power signal from the contactor 120, and because the contactor 120 cannot send the power signal to the power-consuming device 125 unless the contactor 120 receives the control signal from the relay 390 of the LCS 250, it can be said that the LCS 250 delivers power to the power-consuming device 125. The process forms a continuous loop between steps 510 and 512 until the start time of the control event is the current time.

In step 514, the control power delivered to the power-consuming device 125 is terminated. Specifically, the control power delivered to the coil 341 of the contactor 120 is terminated. The control power can be terminated by the LCS 250. Specifically, the control power is terminated by the hardware processor 330 and/or the power storage device 324. For example, at the start time of the control event, the hardware processor 330 and/or the power storage device 324 stops sending a voltage to the coil 392 of the relay 390 of the LCS 250. When the coil 392 of the relay 390 is deenergized, the normally-open contact 394 of the relay 394 is opened (disabled), which prevents the control power from flowing to the contactor 120 (which, in turn, turns off the power-consuming device 125 by terminating the power signal flowing to the power-consuming device 125).

In step 516, a determination is made as to whether the end time of the control event is the current time. The end time of the control event is when the control event ends. The end time can be in terms of a clock time (e.g., 9:30 a.m. Central standard time), an amount of time (e.g., the control event begins in 10 minutes), immediately, or some other suitable form of time. In certain exemplary embodiments, the end time that the control event is scheduled to occur is determined by the hardware processor 330 using the timer 332. The current time is determined by the timer 332 and communicated to the hardware processor 330. The hardware processor compares the end time and the current time. If the hardware processor 330 determines that the end time of the control event is the current time, then the process proceeds to step 518. If the hardware processor 330 determines that the start time of the control event is not the current time, then the process reverts to step 514. In such a case, the process forms a continuous loop between steps 514 and 516 until the end time of the control event is the current time.

In step 518, control power is delivered to the power-consuming device 125. Specifically, control power is delivered to the coil 341 of the contactor 120. In certain exemplary embodiments, the hardware processor 330 allows control power to flow to the power-consuming device 125. For example, as in step 512, the hardware processor 330 sends a voltage to the coil 392 of the relay 390 of the LCS 250. When the coil 392 of the relay 390 is energized, the normally-open contact 394 of the relay 394 is closed (enabled), which allows the control power to flow to the contactor 120 (which, in turn, turns on the power-consuming device 125 by allowing a power signal to flow to the power-consuming device 125).

In step 520, a determination is made as to whether the energy signal continues to be received. In other words, the power storage device conditioner 310 is unable to charge the power storage device 324 because the power storage device conditioner 310 no longer receives the energy signal from the energy source, possibly using the CT 255. In certain exemplary embodiments, the determination as to whether the energy signal continues to be received is made by the hardware processor 330 of the LCS 250. Such a determination can be made using one or more of a number of methods, including but not limited to communicating with the power storage device detector 322, measuring a voltage with a voltmeter within the hardware processor 330, and measuring a current with an ammeter within the hardware processor 330. If the energy signal continues to be received, the process reverts to step 518. In such a case, the process forms a continuous loop between steps 516 and 518 until the energy signal is no longer received. If the energy signal is no longer received (is terminated), the process proceeds to step 522.

In step 522, the LCS 250 operates in a limited mode. Specifically, the hardware processor 330 and/or the communication component 350 stop operating in a regular mode and start operating in a limited mode. In addition, one or more other components (e.g., the indicating lights 370, the boost converter 320, the battery detector 322) can be turned off or operate in a limited mode. The LCS 250 can operate in a limited mode based on one or more of a number of events, including but not limited to passage of time (e.g., the amount of time since last receiving the current transformed signal), a manual instruction from a user 190, the day of the week, and the month of the year.

In such a case, because the energy signal is no longer delivered to the power storage device 324, the hardware processor 330 stops sending a voltage to the coil 392 of the relay 390 of the LCS 250. When the coil 392 of the relay 390 is deenergized, the normally-open contact 394 of the relay 394 is opened (disabled), which prevents the control power from flowing to the contactor 120 (and, thus, the power-consuming device 125). After step 520, the method ends at the END step.

Figure 6:
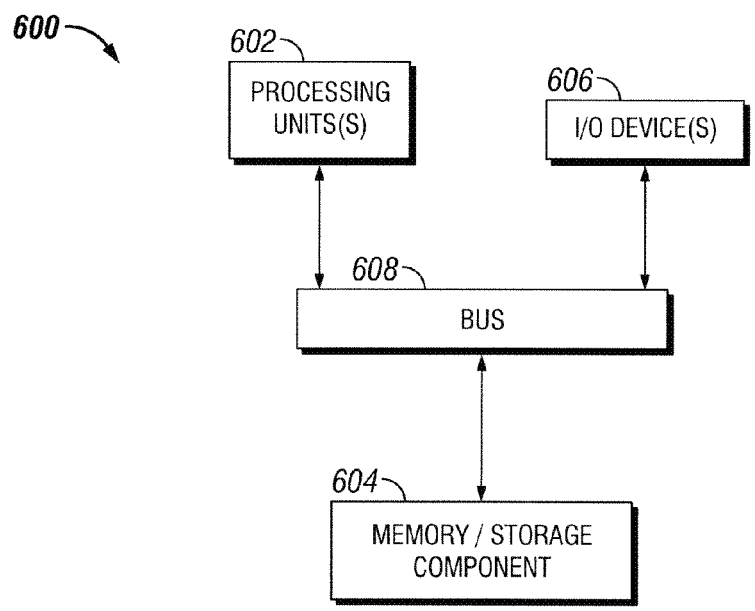
FIG. 6 shows a computer system used with an exemplary LCS in accordance with certain exemplary embodiments.

FIG. 6 illustrates one embodiment of a computing device 600 capable of implementing one or more of the various techniques described herein, and which may be representative, in whole or in part, of the elements described herein. Referring to FIGS. 1-6, the computing device 600 is only one example of a computing device and is not intended to suggest any limitation as to scope of use or functionality of the computing device and/or its possible architectures. Neither should computing device 600 be interpreted as having any dependency or requirement relating to any one or combination of components illustrated in the example computing device 600. As shown in FIG. 6, the bus 608 is operatively coupled to each of the processing unit(s) 602, the I/O device(s) 606, and the memory/storage component 604.

Computing device 600 includes one or more processors or processing units 602, one or more memory/storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Memory/storage component 604 may include volatile media (such as random access memory (RAM)) and/or nonvolatile media (such as read only memory (ROM), flash memory, optical disks, magnetic disks, and so forth). Memory/storage component 604 can include fixed media (e.g., RAM, ROM, a fixed hard drive, etc.) as well as removable media (e.g., a Flash memory drive, a removable hard drive, an optical disk, and so forth).

One or more I/O devices 606 allow a customer, utility, or other user 190 to enter commands and information to computing device 600, and also allow information to be presented to the customer, utility, or other user 190 and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media may be any available non-transitory medium or non-transitory media that can be accessed by a computing device. By way of example, and not limitation, computer readable media may comprise "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computer device 600 may be connected to a network (not shown) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system 600 includes at least the minimal processing, input, and/or output means necessary to practice one or more embodiments.

Further, those skilled in the art will appreciate that one or more elements of the aforementioned computer device 600 may be located at a remote location and connected to the other elements over a network. Further, one or more exemplary embodiments may be implemented on a distributed system having a plurality of nodes, where each portion of the implementation (e.g., communication component 350, hardware processor 330) may be located on a different node within the distributed system. In one or more embodiments, the node corresponds to a computer system. Alternatively, the node may correspond to a processor with associated physical memory. The node may alternatively correspond to a processor with shared memory and/or resources.

Exemplary embodiments provide for energy harvesting LCSs. Specifically, exemplary embodiments provide for a LCS that is electrically coupled to one or more high voltage (e.g., at least 110 VAC) conductors, terminals, and/or other electrical connections. In addition, the exemplary LCS (or particular components thereof, such as the hardware processor and/or the communications component) can enter into a limited mode of operation, saving energy when the LCS is not in use. Thus, the charge of the power storage device of the LCS stays at a high level for a longer period of time when the LCS is not in use. As a result, the LCS consumes less energy using exemplary embodiments described herein.

In addition, exemplary embodiments allow for savings in cost and material with respect to a LCS. Specifically, engineers designing a system using a LCS can use more available and less expensive conductor sizes (voltage and/or amperage rating) because, using exemplary LCSs, a clamp-on or similar type of CT can be used to surround an existing voltage conductor carrying a line voltage. As such, less cost and material is required for a particular LCS because less material is required.

In addition, the use of exemplary energy harvesting LCSs can allow an individual who is not a licensed electrician to install the LCS. In such a case, installation costs are reduced, and there is no need to work with the schedule of a third party to install the LCS. Further, even when not installed by a licensed electrician, the installed LCS allows the applicable electrical system to meet any applicable codes and/or regulations.

Although embodiments described herein are made with reference to exemplary embodiments, it should be appreciated by those skilled in the art that various modifications are well within the scope and spirit of this disclosure. Those skilled in the art will appreciate that the exemplary embodiments described herein are not limited to any specifically discussed application and that the embodiments described herein are illustrative and not restrictive. From the description of the exemplary embodiments, equivalents of the elements shown therein will suggest themselves to those skilled in the art, and ways of constructing other embodiments using the present disclosure will suggest themselves to practitioners of the art. Therefore, the scope of the exemplary embodiments is not limited herein.

What is claimed is:

1. A method for controlling power delivered to a power-consuming device, the method comprising:
   receiving, from a current transformer, a low voltage energy signal harvested from a high voltage energy signal generated by an energy source;
   conditioning, using a power storage device conditioner of a load control switch, the low voltage energy signal to generate a trickle charge;
   charging a power storage device of the load control switch using the trickle charge generated by the power storage device conditioner;
   applying power from the power storage device to a plurality of components of the load control switch, wherein the plurality of components of the load control switch comprises a timer, a hardware processor, and a communication component;
   determining, using the communication component, the hardware processor, and the timer, a start time of a control event;
   terminating, using a relay at the start time of the control event, the power delivered to the power-consuming device, wherein the relay is energized using the power applied to the hardware processor of the load control switch by the power storage device of the load control switch; and
   delivering, using the relay at an end time of the control event, the power to the power-consuming device, wherein when the current transformer initiates generating the low voltage energy signal or when the hardware processor stops operating in a limited mode, the communication component searches for a signal associated with the control event for a delay period of time while a relay contact of the relay is held in an open position for the delay period of time.

2. The method of claim 1, further comprising:
boosting the low voltage energy signal to generate a boosted signal;
delivering the boosted signal to a coil of the relay up until the start time of the control event and at the end time of the control event,
wherein delivering the boosted signal to the coil closes the relay contact.

3. The method of claim 1, further comprising:
operating the communication component and the hardware processor in a limited mode prior to receiving the low voltage energy signal harvested from the energy source.

4. The method of claim 1, wherein the hardware processor determines the start time and the end time based on a current time provided by the timer.

5. The method of claim 1, wherein the high voltage signal flows through a conductor, wherein the high voltage signal is at least 110 volts alternating current.

6. The method of claim 5, wherein the high voltage signal is also transformed into a control signal by a transformer and delivered to one end of the relay contact by a thermostat.

7. The method of claim 6, wherein the control signal delivered from the transformer to the thermostat is approximately 24 volts alternating current.

8. The method of claim 7, wherein the thermostat sends the control signal to the relay contact when an ambient temperature exceeds a high temperature threshold.

9. The method of claim 1, wherein the power-consuming device is an air conditioning unit.

10. A load control switch, comprising:
a current transformer that is configured to harvest a low voltage energy signal from a high voltage signal generated by an energy source;
a housing comprising:
a power storage device conditioner electrically coupled to the current transformer, wherein the power storage device conditioner receives the low voltage energy signal and generates a trickle charge;
a power storage device electrically coupled to the power storage device conditioner, wherein the power storage device receives the trickle charge to store power;
a timer electrically coupled to the power storage device, wherein the timer operates using the power stored by the power storage device;
memory for storing a plurality of instructions;
a hardware processor electrically coupled to the power storage device and the timer, and communicably coupled to the memory, wherein the hardware processor executes the plurality of instructions stored in the memory, wherein the hardware processor operates using the power stored by the power storage device;
a communication component communicably coupled to the hardware processor, wherein the communication component receives a signal for a control event; and
a relay electrically coupled to the hardware processor, wherein the relay comprises a relay contact, wherein the relay contact has an open state and a closed state, wherein the open state is enabled during the control event, and wherein the closed state is enabled outside of the control event,
wherein the relay contact is configured to couple to an energy-consuming device, and
wherein when the current transformer initiates generating the low voltage energy signal or when the hardware processor stops operating in a limited mode, the communication component searches for a signal associated with the control event for a delay period of time while the relay contact is held in an open position for the delay period of time.

11. The load control switch of claim 10, wherein the housing further comprises:
a boost converter electrically coupled to the current transformer and the hardware processor, wherein the boost converter generates a voltage to energize a coil of the relay outside of the control event.

12. The load control switch of claim 11, wherein the voltage is approximately 50% greater than the low voltage energy signal received by the boost converter from the current transformer.

13. The load control switch of claim 11, wherein the boost converter is further electrically coupled to the communication component.

14. The load control switch of claim 10, wherein the power storage device is a 1.1 amp-hour power storage device.

15. The load control switch of claim 10, wherein the timer, the hardware processor, and the communication component operate in the limited mode when an amount of time since receiving the low voltage energy signal from the current transformer exceeds a threshold time.

16. The load control switch of claim 15, wherein the limited mode comprises at least one selected from a group consisting of checking for a signal associated with a control event on a periodic basis and otherwise being idle, and being idle until receiving a signal associated with a control event.

17. The load control switch of claim 10, wherein the current transformer comprises a clamp and at least one lead, wherein the clamp is positioned around a conductor carrying the high voltage signal, and wherein the power storage device is electrically coupled to at least one lead of the current transformer.

18. The load control switch of claim 10, wherein the communication component uses radio frequency radio to communicate with a user.

19. A system, comprising:
a power-consuming device;
a transformer that processes a high voltage signal carried on a conductor from a primary power source;
a thermostat electrically coupled to the transformer, wherein the thermostat has an enabled state and a disabled state, wherein the enabled state allows power from the primary power supply to pass therethrough, and wherein the disabled state prevents the power from the primary power supply to pass therethrough; and
a load control switch electrically coupled to the thermostat and the power-consuming device, wherein the load control switch comprises:
a current transformer that generates a low voltage signal from a high voltage signal, wherein the high voltage signal is generated by an energy source;
a power storage device conditioner coupled to the current transformer, wherein the power storage device conditioner receives the low voltage energy signal and generates a trickle charge;
a power storage device electrically coupled to the power storage device conditioner, wherein the power storage device receives the trickle charge to store power;

a timer electrically coupled to the power storage device, wherein the timer operates using the power stored by the power storage device;

memory for storing a plurality of instructions;

a hardware processor electrically coupled to the power storage device and the timer, and communicably coupled to the memory, wherein the hardware processor executes the plurality of instructions stored in the memory, wherein the hardware processor operates using the power stored by the power storage device;

a communication component communicably coupled to the hardware processor, wherein the communication component receives a signal for a control event; and a relay electrically coupled to the hardware processor, the thermostat, and the power-consuming device, wherein the relay comprises a relay contact, wherein the relay contact has an open state and a closed state, wherein the open state is enabled during the control event, and wherein the closed state is enabled outside of the control event, wherein the relay contact, when in the closed state, delivers the voltage signal processed by the transformer to the power-consuming device, and wherein when the current transformer initiates generating the low voltage energy signal or when the hardware processor stops operating in a limited mode, the communication component searches for a signal associated with the control event for a delay period of time while the relay contact is held in an open position for the delay period of time.

* * * * *